US012257591B2

(12) United States Patent
Wang

(10) Patent No.: US 12,257,591 B2
(45) Date of Patent: Mar. 25, 2025

(54) CLEANING DEVICE FOR GLUE-DISPENSING NEEDLE

(71) Applicant: TRIPLE WIN TECHNOLOGY(SHENZHEN) CO. LTD., Shenzhen (CN)

(72) Inventor: Hung-Kun Wang, New Taipei (TW)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 523 days.

(21) Appl. No.: 17/700,649

(22) Filed: Mar. 22, 2022

(65) Prior Publication Data

US 2022/0297149 A1 Sep. 22, 2022

(30) Foreign Application Priority Data

Mar. 22, 2021 (CN) ......................... 202120578217.6

(51) Int. Cl.
*B05B 15/522* (2018.01)
*B05C 5/02* (2006.01)
*B08B 1/10* (2024.01)

(52) U.S. Cl.
CPC ............ *B05B 15/5223* (2018.02); *B05C 5/02* (2013.01); *B08B 1/10* (2024.01)

(58) Field of Classification Search
CPC ..... B08B 9/0436; B08B 15/5223; B08B 1/10; B05C 5/02; B05B 15/522; B05B 15/5225; B23K 9/26
USPC ........ 15/104.05, 104.068, 104.062, 104.069, 15/104.16
See application file for complete search history.

(56) References Cited

U.S. PATENT DOCUMENTS 5,845,357 A * 12/1998 Anderson .............. B23K 9/328 15/93.1
6,309,148 B1 * 10/2001 Wang ..................... B23Q 16/10 408/87

FOREIGN PATENT DOCUMENTS

WO WO-9623619 A1 * 8/1996 ............... B23K 7/10

OTHER PUBLICATIONS

Translation of WO96023619A1 (Year: 1996).*

* cited by examiner

*Primary Examiner* — Tom Rodgers
(74) *Attorney, Agent, or Firm* — ScienBiziP, P.C.

(57) ABSTRACT

A precision cleaning device for cleaning and clearing a glue-dispensing needle includes a base, a supporting unit disposed on the base, a moving unit movably connected to the supporting unit, a clearing needle connected to the moving unit and facing the supporting unit, and an adjusting unit connected to the moving unit. The adjusting unit adjusts a movement of the moving unit to drive the clearing needle to move towards the glue-dispensing needle on the supporting unit, allowing the clearing needle to pass through the glue-dispensing needle to completely clean and clear the glue-dispensing needle. The cleaning device also prolongs the service life of the glue-dispensing needle.

13 Claims, 6 Drawing Sheets

CLEANING DEVICE FOR GLUE-DISPENSING NEEDLE

FIELD

The subject matter relates to a glue-dispensing device, and more particularly, to a cleaning device for a glue-dispensing needle.

BACKGROUND

An existing needle for dispensing glue includes a cavity for receiving glue, and an inner surface of the cavity is treated by a coating or mirror polishing to stabilize the glue in the needle.

There are two common methods to clean the remaining glue from a glue-dispensing needle after use. The first method is using a carbonized glue with a high-temperature of 400° C. to clean the cavity of the needle, which is dangerous to the user and not saving of energy. The second method is using a tungsten wire to pull through and clean the needle. However, the tungsten wire is thin and soft, which cannot accurately reach all of the surfaces inside the cavity. Moreover, the tungsten wire may scratch the inner surface of the needle and even causes damage to the needle, thereby shortening the service life of the needle and making the amount of the glue in the needle unstable.

BRIEF DESCRIPTION OF THE DRAWINGS

Implementations of the present technology will now be described, by way of example only, with reference to the attached figures.

DETAILED DESCRIPTION

Figure 1:
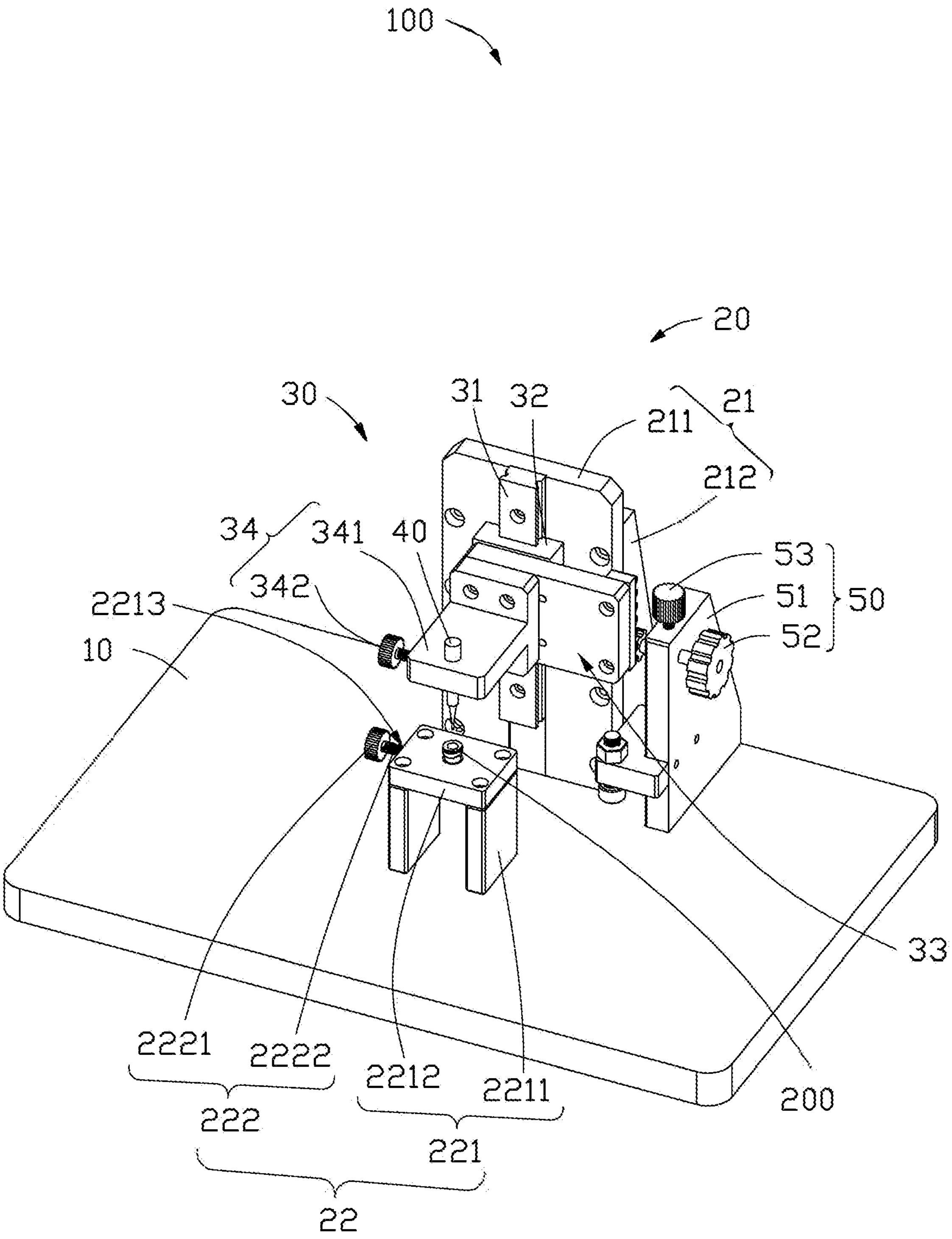
FIG. 1 is a diagrammatic view of an embodiment of a cleaning device for a glue-dispensing needle according to the present disclosure.

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

FIG. 1 illustrates an embodiment of a cleaning device 100 for cleaning and clearing glue residue from a glue-dispensing needle 200. The cleaning device 100 includes a base 10, a supporting unit 20, a moving unit 30, a clearing needle 40, and an adjusting unit 50. The supporting unit 20 and the adjusting unit 50 are disposed on the base 10. The supporting unit 20 is used to support the glue-dispensing needle 200. The moving unit 30 is movably connected to the supporting unit 20. The clearing needle 40 is connected to the moving unit 30 and facing the supporting unit 20. The adjusting unit 50 is connected to the moving unit 30. The adjusting unit 50 is used to adjust a position of the moving unit 30 to drive the clearing needle 40 to move towards the glue-dispensing needle 200 on the supporting unit 20, thereby allowing the clearing needle 40 to pass through the glue-dispensing needle 200 to clean the glue residue from the glue-dispensing needle 200.

In an embodiment, the glue-dispensing needle 200 defines a needle hole, a cone hole, and a cylindrical hole arranged in turn. The needle hole, the cone hole, and the cylindrical hole are connected to each other in discharging the glue. In an embodiment, a diameter of the cone hole is smaller than that of the cylindrical hole.

Figure 2:
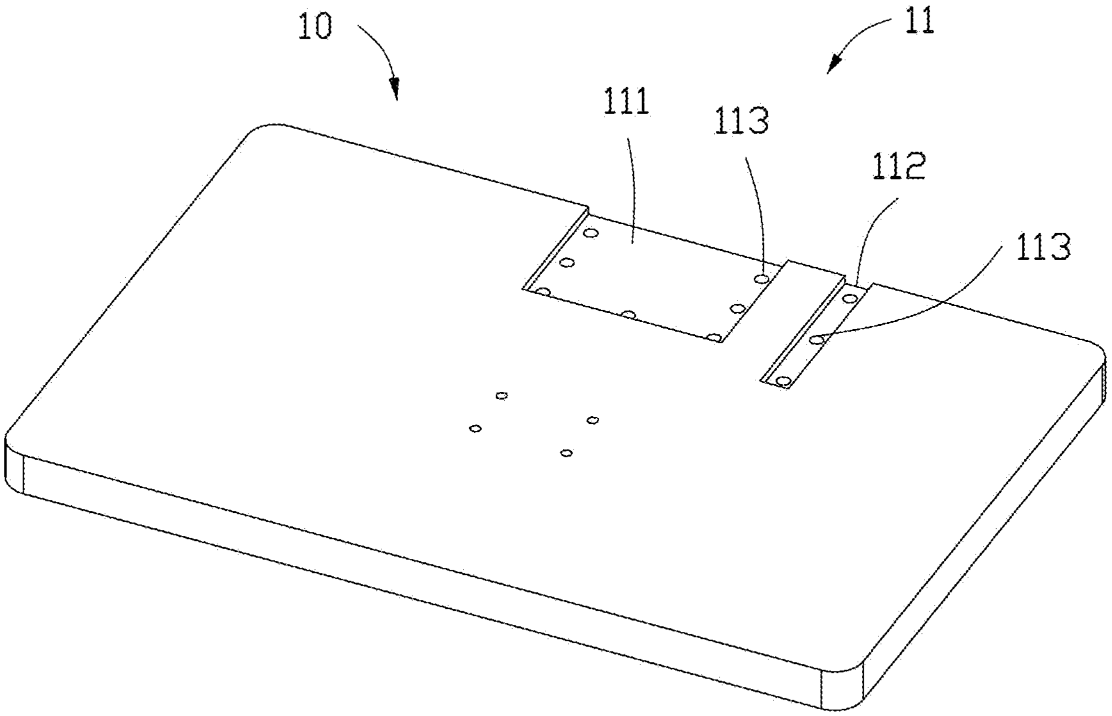
FIG. 2 is a diagrammatic view of a base of the cleaning device of FIG. 1.

Referring to FIG. 2, the base 10 includes a mounting structure 11. The mounting structure 11 defines a plurality of first through holes 113. In an embodiment, the mounting structure 11 includes a first mounting portion 111 and a second mounting portion 112. The first mounting portion 111 is used to support the supporting unit 20. The second mounting portion 112 is used to support the adjusting unit 50. The first mounting portion 111 defines a plurality of first through holes 113. The first through holes 113 in the first mounting portion 111 allow fixing screws (not shown) to pass through to fix the supporting unit 20. The second mounting portion 112 also defines a plurality of first through holes 113. The first through holes 113 in the second mounting portion 112 allow fixing screws (not shown) to pass through to fix the adjusting unit 50.

Figure 3:
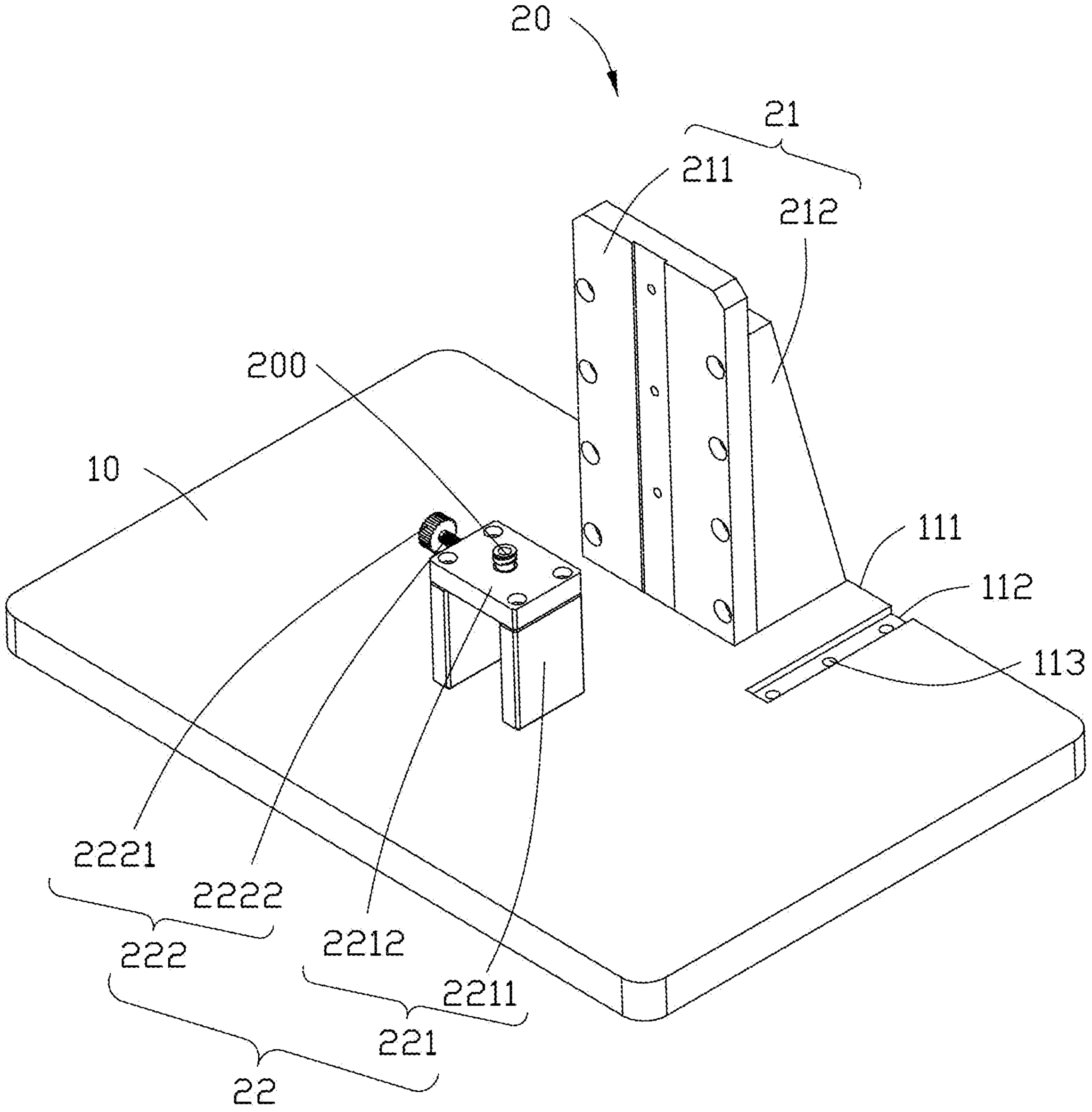
FIG. 3 is a diagrammatic view of a supporting unit of the cleaning device of FIG. 1.

Referring to FIG. 3, the supporting unit 20 includes a first supporting structure 21 and a second supporting structure 22 disposed on the base 10. The first supporting structure 21 is used to support the moving unit 30. The second supporting structure 22 supports the glue-dispensing needle 200. In an embodiment, the first supporting structure 21 and the second supporting structure 22 are opposite to each other.

The first supporting structure 21 includes a first supporting plate 211 and two second supporting plates 212. The two second supporting plates 212 are disposed on two sides of the first supporting plate 211 to support the first supporting plate 211, so as to avoid trembling or vibration of the first supporting plate 211, which may cause adverse effects when cleaning and clearing the glue-dispensing needle 200.

The first supporting plate 211 is disposed on the first mounting portion 111. A sidewall of the first supporting plate 211 connected to the base 10 defines a plurality of second through holes (not shown). The first supporting plate 211 is fixed on the base 10 through passing fixing screws (not shown) through the first through holes 113 and the corresponding second through holes.

Each of the two second supporting plates 212 is disposed on the first mounting portion 111. A sidewall of the second supporting plate 212 connected to the base 10 defines a plurality of third through holes (not shown). The second supporting plate 212 is fixed on the base 10 through passing fixing screws (not shown) through the first through holes 113 and the corresponding third through holes.

The second supporting structure 22 includes a supporting frame 221 and a first locking screw 222. The supporting frame 221 is used to support the glue-dispensing needle 200. The first locking screw 222 is disposed on one side of the supporting frame 221. The first locking screw 222 fixes the glue-dispensing needle 200 firmly in place to avoid the movement of the glue-dispensing needle 200 when cleaning and clearing are applied.

In an embodiment, the supporting frame 221 includes two third supporting plates 2211 and a fourth supporting plate 2212. The two third supporting plates 2211 are disposed on the base 10. One end of each third supporting plate 2211 is fixed on the base 10, and the other end of each third supporting plate 2211 is connected to the fourth supporting plate 2212. In a length direction, each third supporting plate 2211 is roughly perpendicular to a plane of the fourth supporting plate 2212. The plane of the fourth supporting plate 2212 is used to support the glue-dispensing needle 200.

The fourth supporting plate 2212 defines one or more needle through holes (not shown). Each needle through hole can receive the glue-dispensing needle 200. In an embodiment, diameters of the needle through holes are one size or can be of various diameters, to receive different glue-dispensing needles 200 with a same size or different sizes. The diameter of each needle through hole can be designed according to actual needs, and not limited here.

A sidewall of the fourth supporting plate 2212 further defines one or more first limiting through holes 2213 connected to the needle through hole. Each first limiting through hole 2213 is used to connect to the first locking screw 222. One first locking screw 222 passes through one first limiting through hole 2213 to abut against a sidewall of the glue-dispensing needle 200, so that the glue-dispensing needle 200 is fixed in the needle through hole, to avoid poor cleaning caused by vibration or shaking of the glue-dispensing needle 200 during cleaning. In an embodiment, the number of the first limiting through holes 2213 may be one. The number of the first limiting through holes 2213 may be set according to the number of the needle through holes to ensure each glue-dispensing needle 200 can be fixed.

The first locking screw 222 includes a knob portion 2221 and an abutting portion 2222. The abutting portion 2222 is received in the needle through hole, and one end of the abutting portion 2222 is connected to the knob portion 2221. The knob portion 2221 is outside of the needle through hole. The abutting portion 2222 is controlled to move towards or away from the glue-dispensing needle 200 when the knob portion 2221 is rotated, thereby allowing the abutting portion 2222 to abut against or allow slack of the glue-dispensing needle 200.

Figure 4:
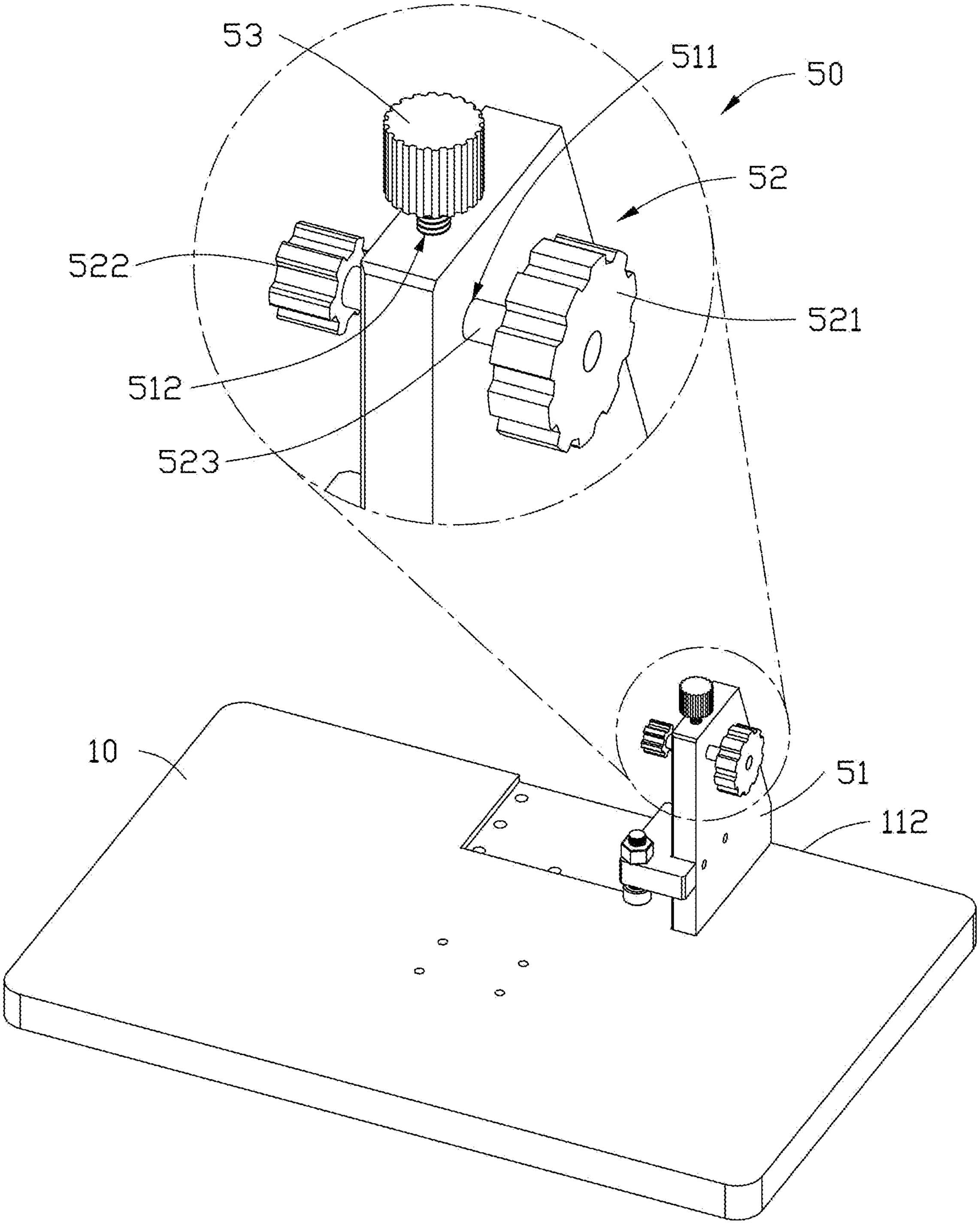
FIG. 4 is a diagrammatic view of an adjusting unit of the cleaning device of FIG. 1.

Referring to FIGS. 1 and 4, the adjusting unit 50 is disposed on the second mounting portion 112 of the base 10. The adjusting unit 50 and the second mounting portion 112 are fixed on the base 10 through fixing screws (not shown).

The adjusting unit 50 includes an adjusting carrier plate 51, a gear assembly 52, and a second locking screw 53. The adjusting carrier plate 51 is disposed on the second mounting portion 112. The gear assembly 52 and the second locking screw 53 are disposed on the adjusting carrier plate 51. The gear assembly 52 is connected to the moving unit 30, and used to adjust the movement of the moving unit 30. The second locking screw 53 abuts against the gear assembly 52 to fix the gear assembly 52. A structure of the second locking screw 53 is same as a structure of the first locking screw 222, which will not be repeated here.

A sidewall of the adjusting carrier plate 51 connected to the base 10 defines a plurality of fifth through holes (not shown), and the adjusting carrier plate 51 is fixed on the base 10 by passing fixing screws through the first through holes 113 and the fifth through holes. The adjusting carrier plate 51 defines a rotating through hole 511 along a direction parallel to the base 10. The rotating through hole 511 allows the gear assembly 52 to pass through. The adjusting carrier plate 51 further defines a second limiting through hole 512 along a direction perpendicular to the base 10. The second limiting through hole 512 receives the second locking screw 53. The rotating through hole 511 is connected to the second limiting through hole 512. The second locking screw 53 abuts against the gear assembly 52 to fix the gear assembly 52, so as to avoid the inaccuracy caused by a reverse rotation of the gear assembly 52 during adjustment, and improves the cleaning effectiveness of the glue-dispensing needle 200.

The gear assembly 52 includes a first gear 521, a second gear 522, and a connector 523. The connector 523 passes through the rotating through hole 511. The first gear 521 and the second gear 522 are connected to ends of the connector 523. The second locking screw 53 abuts the connector 523 after passing through the second limiting through hole 512. The second gear 522 is movably connected to the moving unit 30. The second gear 522 is driven to rotate when the first gear 521 rotates, thereby driving the moving unit 30 to move up and down.

Figure 5:
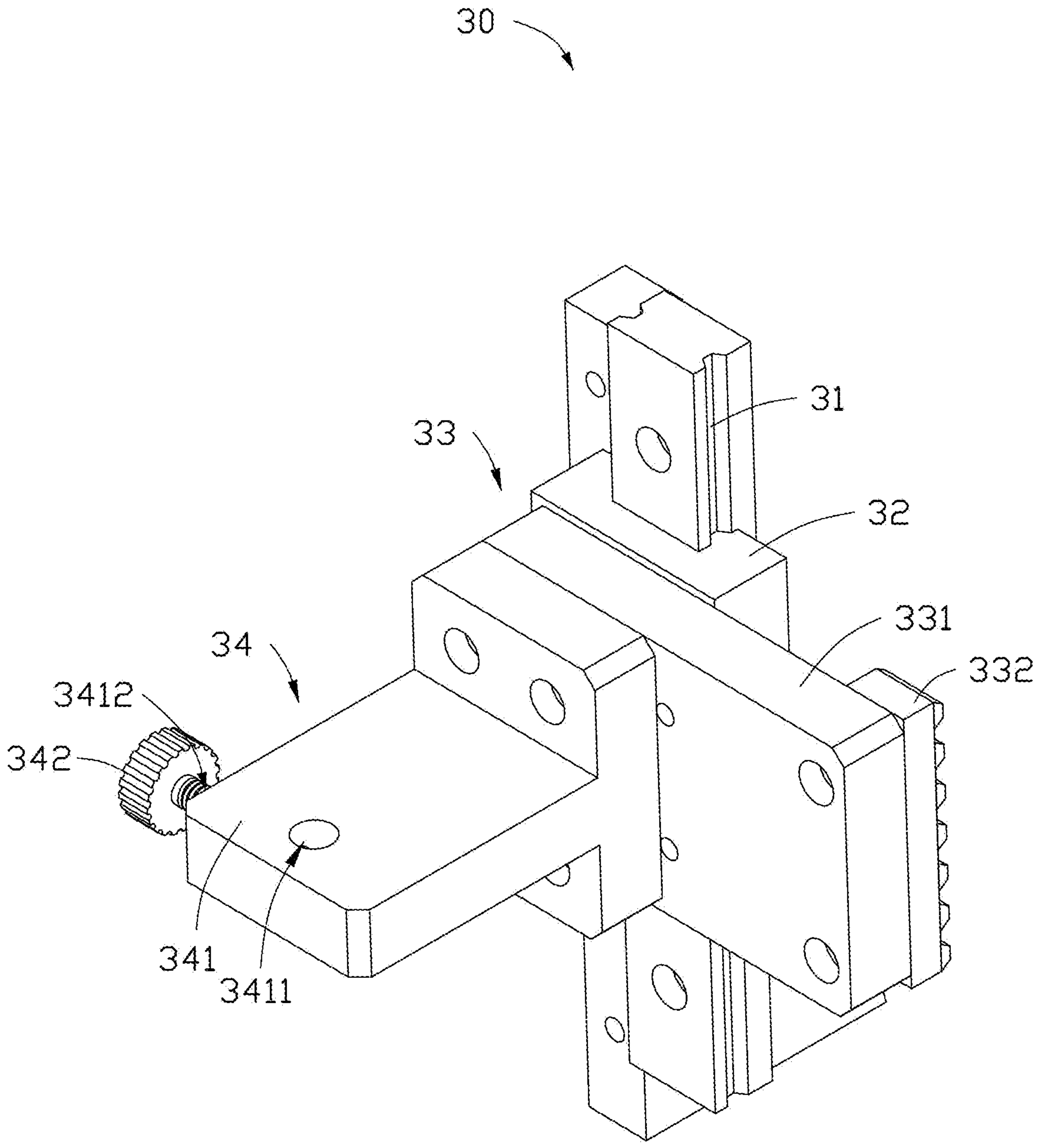
FIG. 5 is a diagrammatic view of a moving unit of the cleaning device of FIG. 1.

Referring to FIGS. 1 and 5, the moving unit 30 adjusts the movement of the clearing needle 40 towards the glue-dispensing needle 200 on the supporting unit 20, thereby allowing the clearing needle 40 to pass through the glue-dispensing needle 200 to clean the glue-dispensing needle 200.

The moving unit 30 includes a slide rail 31, a slide block 32, a rack structure 33, and a needle supporting structure 34. The slide rail 31 is connected to the first supporting plate 211. The slide block 32 is slidably connected to the slide rail 31 to move along the slide rail 31. One side of the rack structure 33 is connected to the slide block 32, and the other side of the rack structure 33 is connected to the needle supporting structure 34. The rack structure 33 is further movably connected to the adjusting unit 50. The adjusting unit 50 drives the rack structure 33 to move, thereby driving the slide block 32 to move along the slide rail 31, and then the needle supporting structure 34 can be driven to move along the slide rail 31 to control the movement of the clearing needle 40 in a direction perpendicular to the base 10.

The rack structure 33 includes a rack supporting plate 331 and a rack 332. One end of the rack 332 is connected to the rack supporting plate 331, and the other end of the rack 332 is movably connected to the gear assembly 52. The rack 332 is driven to rotate when the gear assembly 52 rotates, thereby driving the rack supporting plate 331 to move. For example, the other end of the rack 332 is movably connected to the second gear 522 of the gear assembly 52. The rack 332 is driven to rotate when the second gear 522 rotates, thereby driving the rack supporting plate 331 to move.

The needle supporting structure 34 includes a needle supporting plate 341 and a third locking screw 342. The needle supporting plate 341 is connected to the rack supporting plate 331. The needle supporting plate 341 defines a clearing needle through hole 3411 for receiving the clearing needle 40. The needle supporting plate 341 further defines a third limiting through hole 3412 connected to the clearing needle through hole 3411 in a direction perpendicular to an axis of the clearing needle through hole 3411. The third limiting through hole 3412 in the needle supporting plate 341 is used to receive the third locking screw 342. The third locking screw 342 abuts the clearing needle 40 to fix the clearing needle 40 on the needle supporting plate 341, so as to avoid offsetting the clearing needle 40 during movement, and accuracy of adjustment is thereby improved.

Figure 6:
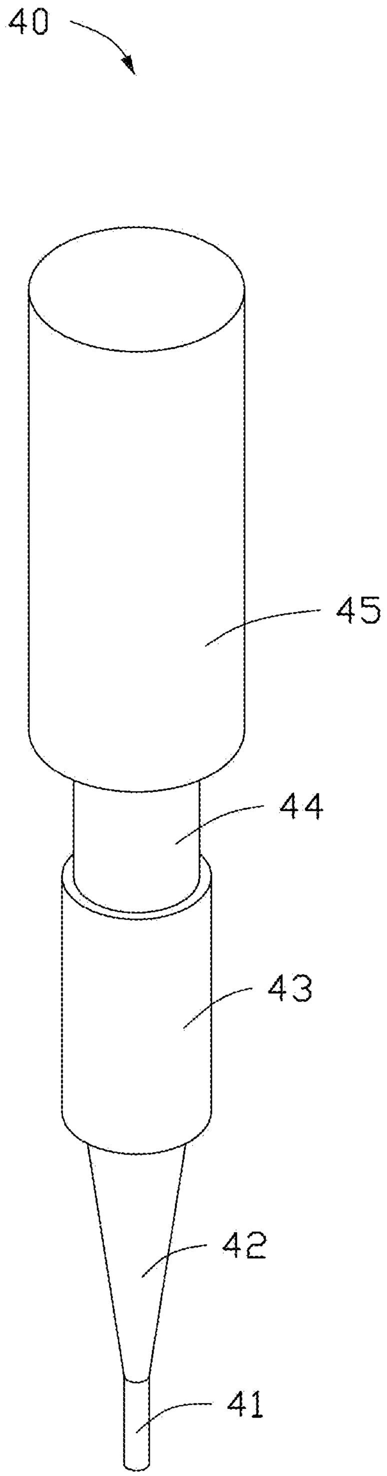
FIG. 6 is a diagrammatic view of a clearing needle of the cleaning device of FIG. 1.

Referring to FIGS. 1 and 6, the clearing needle 40 is disposed opposite to the glue-dispensing needle 200. A center of the clearing needle 40 overlaps with a center of the glue-dispensing needle 200. A structure of the clearing needle 40 is similar to a structure of the glue-dispensing needle 200. In an embodiment, the clearing needle 40 includes a head 41, a cone portion 42, a first connecting portion 43, a second connecting portion 44, and a third connecting portion 45 successively connected to each other. That is, one end of the cone portion 42 is connected to the head 41, the other end of the cone portion 42 is connected to one end of the first connecting portion 43. The other end of the first connecting portion 43 is connected to one end of the second connecting portion 44, and the other end of the second connecting portion 44 is connected to the third connecting portion 45. The first connecting portion 43, the second connecting portion 44, and the third connecting portion 45 are substantively cylindrical structures. A diameter of the first connecting portion 43 is larger than a diameter of the second connecting portion 44, but smaller than a diameter of the third connecting portion 45. The diameter of the second connecting portion 44 is smaller than the diameter of the third connecting portion 45. A diameter of the cone portion 42 is smaller than the diameter of the first connecting portion 43.

The head 41 pulls and clears glue residue from the glue-dispensing needle 200, the first connecting portion 43 is used to limit a length of the head 41 extending in the glue-dispensing needle 200. The third connecting portion 45 is received in the clearing needle through hole 3411. An aperture of the head 41 is smaller than that of the needle hole of the glue-dispensing needle 200, which is convenient for the head 41 to enter the needle hole. A length of the head 41 is larger than a length of the needle hole of the glue-dispensing needle 200, which is convenient for cleaning the needle hole. The diameter of the first connecting portion 43 is smaller than an aperture of the cylindrical hole of the glue-dispensing needle 200, which is convenient for the clearing needle 40 to enter the glue-dispensing needle 200. The diameter of the first connecting portion 43 is larger than an aperture of the cone hole of the glue-dispensing needle 200, and the clearing needle 40 is clamped. A structure of the cone portion 42 of the clearing needle 40 is similar to that of the cone hole of the glue-dispensing needle 200.

For better understanding, a working process of the cleaning device 100 for cleaning and clearing the glue residue from the glue-dispensing needle 200 is described.

The clearing needle 40 is disposed in the clearing needle through hole 3411 of the needle supporting plate 341. The third locking screw 342 passes through the third limiting through hole 3412 connected to the clearing needle through hole 3411 to abut the clearing needle 40, so that the clearing needle 40 is fixed on the needle supporting plate 341. This avoids a deviation of the clearing needle 40 during movement, and improves the accuracy of adjustment.

The glue-dispensing needle 200 is disposed on the second supporting structure 22. The glue-dispensing needle 200 is disposed in the needle through hole of the supporting frame 221. The first locking screw 222 passes through the first limiting through hole 2213 and abuts the sidewall of the glue-dispensing needle 200 to fix the glue-dispensing needle 200 in the needle through hole, so as to avoid poor cleaning caused by the movement of the glue-dispensing needle 200 during cleaning.

The movement of the moving unit 30 is adjusted by the adjusting unit 50 to drive the clearing needle 40 to move towards the glue-dispensing needle 200 on the supporting unit 20, so that the clearing needle 40 can clean the glue-dispensing needle 200. By rotating and adjusting the first gear 521 to drive the second gear 522 to rotate, driving the moving unit 30 to move towards the glue-dispensing needle 200 on the supporting unit 20, the clearing needle 40 is driven towards and to clean the glue-dispensing needle 200.

When the glue-dispensing needle 200 is cleaned, the first gear 521 in the adjusting unit 50 is rotated and adjusted in reverse to drive the second gear 522 to rotate, then the moving unit 30 is driven away from the glue-dispensing needle 200 on the supporting unit 20, so as to retract the clearing needle 40 from the glue-dispensing needle 200 and reset the moving unit 30.

When the glue-dispensing needle 200 is blocked or the glue is not being discharged smoothly, the moving unit 30 is adjusted through the adjusting unit 50 to drive the clearing needle 40 on the moving unit 30 to move towards the glue-dispensing needle 200 on the supporting unit 20, so that the clearing needle 40 can clean the glue-dispensing needle 200. The cleaning device 100 avoids safety hazard of high temperatures in using carbonized glue, and does not scratch or damage the inner surface of the glue-dispensing needle caused by the traditional tungsten wire. The effective cleaning of the glue-dispensing needle 200 by the instant means is improved and the service life of the glue-dispensing needle 200 is prolonged.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure, up to and including, the full extent established by the broad general meaning of the terms used in the claims.

What is claimed is:

1. A cleaning device for cleaning a glue-dispensing needle, comprising:

a base;

a supporting unit disposed on the base, the supporting unit configured to support the glue-dispensing needle;

a moving unit movably connected to the supporting unit;

a clearing needle connected to the moving unit and facing the supporting unit; and an adjusting unit connected to the moving unit, wherein the adjusting unit is configured to adjust a movement of the moving unit to drive the clearing needle to move towards the glue-dispensing needle on the supporting unit, thereby allowing the clearing needle to pass through the glue-dispensing needle to clean the glue-dispensing needle, the supporting unit comprises a first supporting structure and a second supporting structure, the first supporting structure and the second supporting structure are disposed on the base and opposite to each other, the first supporting structure is configured to support the moving unit, and the second supporting structure is configured to support the glue-dispensing needle, the first supporting structure comprises a first supporting plate and two second supporting plates, the two second supporting plates are disposed on two sides of the first supporting plate to support the first supporting plate, the adjusting unit comprises an adjusting carrier plate, a gear assembly, and a second locking screw, the adjusting carrier plate is disposed on the base, the gear assembly and the second locking screw are disposed on the adjusting carrier plate, the gear assembly is connected to the moving unit, the gear assembly is configured to adjust the movement of the moving unit, and the second locking screw abuts against the gear assembly to fix the gear assembly.

2. The cleaning device of claim 1, wherein the second supporting structure comprises a supporting frame and a first locking screw, the supporting frame is configured to support the glue-dispensing needle, the first locking screw is disposed on one side of the supporting frame to fix the glue-dispensing needle.

3. The cleaning device of claim 2, wherein the supporting frame comprises two third supporting plates and a fourth supporting plate, the two third supporting plates are disposed on the base, one end of each of the two third supporting plates is fixed on the base, and the other end of each of the two third supporting plates is connected to the fourth supporting plate, a length direction of each of the two third supporting plates is perpendicular to a plane of the fourth supporting plate, and the plane of the fourth supporting plate is configured to support the glue-dispensing needle.

4. The cleaning device of claim 3, wherein the fourth supporting plate defines at least one first limiting through hole, the at least one first limiting through hole is configured to connect to the first locking screw, the first locking screw passes through the at least one first limiting through hole to abut against a sidewall of the glue-dispensing needle to fix the glue-dispensing needle.

5. The cleaning device of claim 2, wherein the first locking screw comprises a knob portion and an abutting portion, the abutting portion is connected to the glue-dispensing needle, and one end of the abutting portion is connected to the knob portion, the knob portion is outside of the glue-dispensing needle, the abutting portion is controlled to move towards or away from the glue-dispensing needle when the knob portion rotates, thereby allowing the abutting portion to abut against or loosen the glue-dispensing needle.

6. The cleaning device of claim 1, wherein the adjusting carrier plate defines a rotating through hole along a direction parallel to the base, and the rotating through hole is configured for allowing the gear assembly to pass through, and the adjusting carrier plate further defines a second limiting through hole along a direction perpendicular to the base, the second limiting through hole is configured to receive the second locking screw, the rotating through hole is connected to the second limiting through hole, and the second locking screw abuts against the gear assembly to fix the gear assembly.

7. The cleaning device of claim 6, wherein the gear assembly comprises:

a first gear;

a second gear movably connected to the moving unit; and a connector;

wherein the connector passes through the rotating through hole, the first gear and the second gear are respectively connected to two ends of the connector, the second locking screw abuts the connector after passing through the second limiting through hole, the second gear is driven to rotate when the first gear rotates, thereby driving the moving unit to move up and down.

8. The cleaning device of claim 1, wherein the moving unit comprises:

a slide rail connected to the first supporting plate;

a slide block slidably connected to the slide rail to move along the slide rail;

a rack structure, and a needle supporting structure;

wherein one side of the rack structure is connected to the slide block, and the other side of the rack structure is connected to the needle supporting structure.

9. The cleaning device of claim 8, wherein the rack structure is further movably connected to the gear assembly.

10. The cleaning device of claim 9, wherein the rack structure comprises a rack supporting plate and a rack, one end of the rack is connected to the rack supporting plate, and the other end of the rack is movably connected to the gear assembly, the rack is driven to rotate when the gear assembly rotates, thereby driving the rack supporting plate to move.

11. The cleaning device of claim 10, wherein the needle supporting structure comprises a needle supporting plate and a third locking screw, the needle supporting plate is connected to the rack supporting plate, the needle supporting plate defines a clearing needle through hole for receiving the clearing needle, the needle supporting plate further defines a third limiting through hole connected to the clearing needle through hole along a direction perpendicular to an axis of the clearing needle through hole, the third limiting through hole is configured to receive the third locking screw, the third locking screw abuts against and fixes the clearing needle on the needle supporting plate.

12. The cleaning device of claim 1, wherein the clearing needle is disposed opposite to the glue-dispensing needle, a center of the clearing needle overlaps with a center of the glue-dispensing needle.

13. The cleaning device of claim 12, wherein the clearing needle comprises a head, a cone portion, a first connecting portion, a second connecting portion, and a third connecting portion connected to each other successively, the head is configured to clear the glue-dispensing needle, the third connecting portion is connected to the moving unit.

* * * * *